A. F. BARRON.
CLOSET BOWL.
APPLICATION FILED JUNE 2, 1916.

1,205,078.

Patented Nov. 14, 1916.

Witnesses
J. P. Wahler
Roh. Meyer

Inventor
A. F. Barron.
By
Attorney

UNITED STATES PATENT OFFICE.

ANDREW F. BARRON, OF WATERVLIET, NEW YORK.

CLOSET-BOWL.

1,205,078.   Specification of Letters Patent.   Patented Nov. 14, 1916.

Application filed June 2, 1916. Serial No. 101,308.

*To all whom it may concern:*

Be it known that I, ANDREW F. BARRON, a citizen of the United States, residing at Watervliet, in the county of Albany and State of New York, have invented certain new and useful Improvements in Closet-Bowls; and I do hereby declare the following to be a full, clear, and exact description of the invention, such as will enable others skilled in the art to which it appertains to make and use the same.

This invention relates to closet bowls, and more particularly to an improvement upon the closet bowl disclosed in the Letters Patent No. 1,182,735 issued May 9, 1916.

The primary object of this invention is to provide a closet bowl as specified which includes an overflow trap structure which has communication with the interior of the bowl for permitting the water to flow out of the bowl, when the main trap of the bowl becomes clogged, thereby eliminating the liability of the water flowing over the top of the bowl.

A still further object of this invention is to provide a shield for preventing the sealing flow of water from passing into the auxiliary overflow.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawings wherein like characters designate like and corresponding parts throughout the several views, and in which:—

Figure 1:
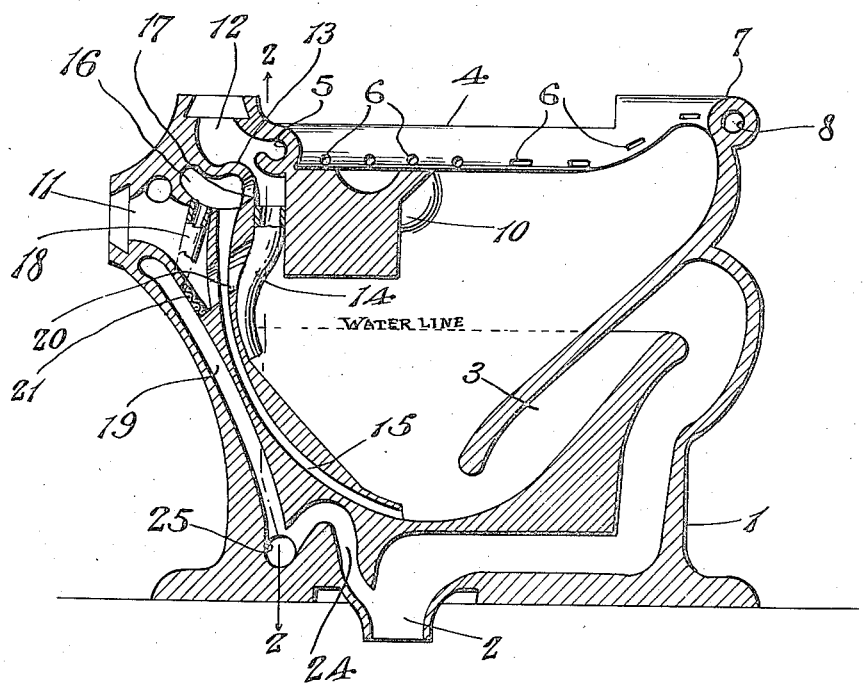
Figure 2:
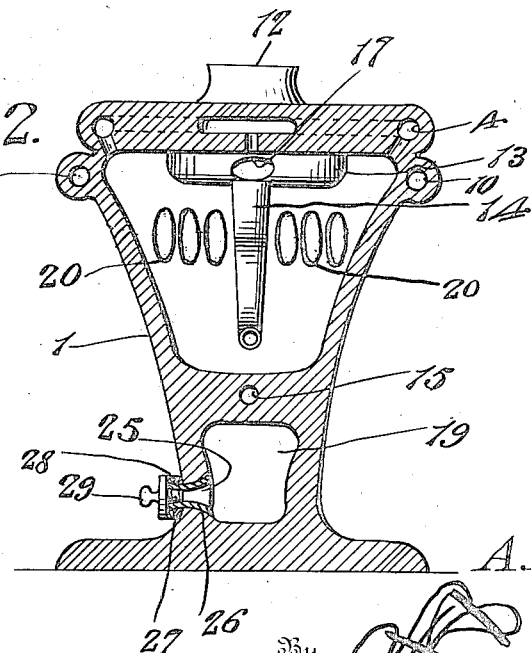

Figure 1 is a vertical section through the improved closet bowl, and Fig. 2 is a cross section on the line 2—2 of Fig. 1.

Referring more particularly to the drawing, 1 designates the closet bowl as an entirety, which is provided with an outlet 2 and the usual type of trap 3. The bowl 1 has its upper edge rolled as shown at 4 for forming the usual water raceway 5 for facilitating the flushing of the bowl with which the plurality of openings 6 communicate. In Fig. 1 of the drawing, rectangular and circular openings 6 are illustrated. The front end or portion of the bowl 1 has the upper curved edge protruding above the remainder of the curved edge of the bowl as shown at 7, to provide a urine guard.

The bowl 1 is provided with a ventilating opening 10 which communicates with the interior of the bowl and with a space 11 formed in the rear portion of the bowl, as clearly set forth in Patent No. 1,182,735.

The flushing water enters the interior of the bowl 1 through the duct 12, passes over a shield 13, and downwardly through a tube 14 along the rear wall of the bowl. The delivery end of the tube 14 is positioned beneath the top of the sealing water line of the bowl so as to prevent splashing, upon the flushing of the bowl. A tube 15 is provided which is embedded in the bowl 1 and has its delivery end positioned directly above the upper surface of the bottom of the trap 3 of the bowl for facilitating the efficient flushing of the bowl, by forcing a stream of water outwardly at the mouth of the trap 3 for aiding in forcing the contents of the bowl into the trap and outwardly through the same.

The upper end of the tube 15 communicates with a compartment 16 formed in the bowl body which compartment is separated from the water inlet 12 by the shield 13. The shield 13 is provided with an opening 17 for permitting the flushing water of the bowl to pass through the opening into the compartment 16 and downwardly through the tube 15, and also through a tube 18 into an auxiliary overflow 19. The tube 18 has its inlet end communicating with the compartment 16 and its delivery end communicating with the overflow passage 19 which is formed in the rearmost portion of the bowl 1.

The auxiliary or overflow duct 19 has communication with the interior of the bowl 1 through openings 20 and 21. A trap 24 is formed in the passage way 19, and the outlet of the trap has communication with the outlet 2 of the main trap 3 of the bowl, as clearly shown in Fig. 2 of the drawing.

A clean-out opening 25 is formed in the bowl body 1 and communicates with the lowermost portion of the trap 24, being provided for cleaning the trap when necessary. A nipple 26 is mounted in the opening 25 and a fluid and air tight joint is formed between the nipple and the bowl 1 by a suitable gasket 27 and nut 28. A closing cap 29 is mounted in the outer end of the nipple 26.

When flushing the bowl, the quantity of water rushing through the inlet 12 will be greater than can be carried off by the duct 5 and the tube 14, and consequently a part of the water will flow through the opening 17 into the space 16, and out of the space 16 through the tubes 15 and 18. The water which flows through the tube 15, will as previously described, flow across the bottom of the recess of the bowl 1 directly in front of the mouth of the trap 3 for facilitating the flushing of the bowl while the water which flows downwardly through the tube 18 will enter the auxiliary or overflow passage 19 and pass outwardly through the trap 24 and the outlet 2.

When the ordinary trap structure 3 of the bowl becomes clogged, the flushing water will fill the bowl, and instead of flowing over the top of the bowl, it will flow through the openings 20 and 21 into the overflow passage 19, and outwardly through this passage.

In reducing the invention to practice certain minor features of construction, combination and arrangement of parts may necessitate alterations to which the patentee is entitled provided such alterations are comprehended within the scope of what is claimed.

What is claimed is:—

1. In a closet bowl structure, the bowl body having an ordinary outlet trap structure, said bowl being provided with an overflow passage, separated from the receiving receptacle of the bowl, said bowl further provided with openings communicating with the receiving receptacle of the bowl and with said overflow passage, a tube for guiding a part of the flushing water of the bowl into said overflow passage, and a shield for preventing the sealing flow of water from passing through said tubes into said overflow passage.

2. In a closet bowl structure, the bowl body having an ordinary outlet trap structure, said bowl being provided with an overflow passage separated from the receiving receptacle of the bowl, said bowl further provided with openings communicating with the receiving receptacle of the bowl and with said overflow passage, a tube for guiding a part of the flushing water of the bowl into said overflow passage, and a shield for preventing the sealing flow of water from passing through said tubes into said overflow passage, a trap formed in the lower portion of said overflow passage and communicating with the outlet of the bowl.

3. In a closet bowl structure, a closet bowl having a seat section, said closet bowl being provided with a water inlet opening, a trap structure in said bowl, arcuate tubes carried by the rear portion of said bowl and having its lower end resting upon the upper surface of the bottom of the recess formed within the bowl a relatively short distance outwardly from the mouth of said trap structure for ejecting a stream of water over the bottom of the recess of the bowl and into the mouth of the trap, a second tube extending downwardly within said bowl along the rear wall of the recess thereof, and having its discharge end positioned for conveying a stream of water for discharge along the rear wall of the recess of the bowl, said second tube having its discharge end positioned below the normal water line of the bowl, an overflow passage formed within said bowl, said bowl being provided with openings communicating with the recess of the bowl and with said overflow passage, a third tube carried by said bowl and provided for conveying a part of the flushing water of the bowl into said overflow passage.

4. In a closet bowl structure, a closet bowl having a seat section, said closet bowl being provided with a water inlet opening, a trap structure in said bowl, arcuate tubes carried by the rear portion of said bowl and having its lower end resting upon the upper surface of the bottom of the recess formed within the bowl a relatively short distance outwardly from the mouth of said trap structure for ejecting a stream of water over the bottom of the recess of the bowl and into the mouth of the trap, a second tube extending downwardly within said bowl along the rear wall of the recess thereof, and having its discharge end positioned for conveying a stream of water for discharge along the rear wall of the recess of the bowl, said second tube having its discharge end positioned below the normal water line of the bowl, an overflow passage formed within said bowl, said bowl being provided with openings communicating with the recess of the bowl and with said overflow passage, a third tube carried by said bowl and provided for conveying a part of the flushing water of the bowl into said overflow passage, a shield positioned within said bowl and provided for preventing the sealing flow of the water from passing downwardly through said first and third named tubes, said shield provided with an opening for permitting of a part of the flushing flow of water to pass through the shield and through said first and third named tube.

In testimony whereof I affix my signature in presence of two witnesses.

ANDREW F. BARRON.

Witnesses:
WILLIAM F. PARKER,
EDWARD A. DUGAN.